No. 835,499. PATENTED NOV. 13, 1906.
M. P. CARPENTER & W. D. FONVILLE.
COMBINED STALK CUTTER AND HARROW.
APPLICATION FILED JUNE 28, 1906.
2 SHEETS—SHEET 1.
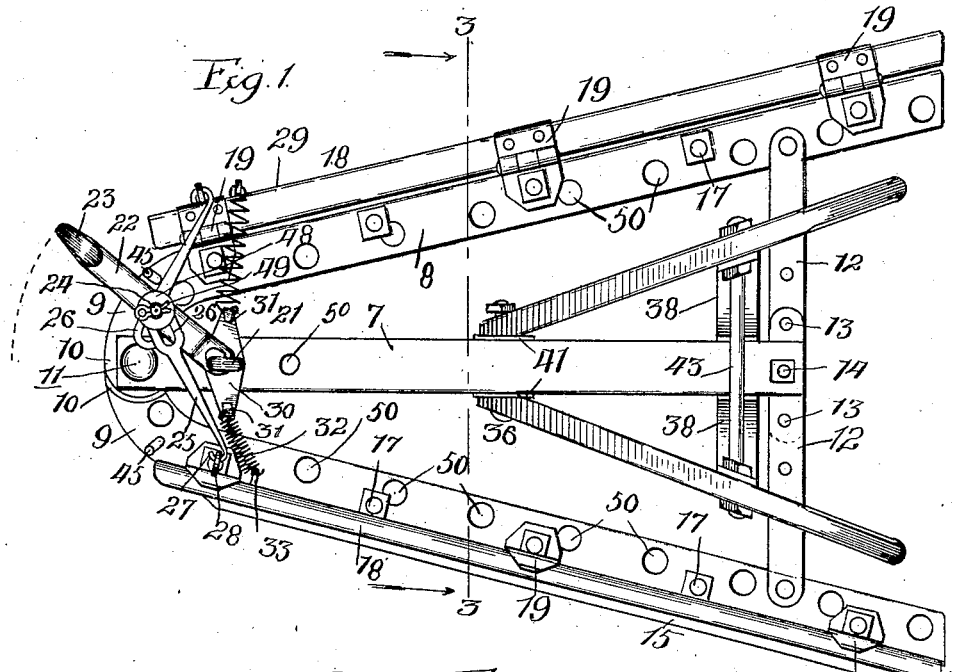
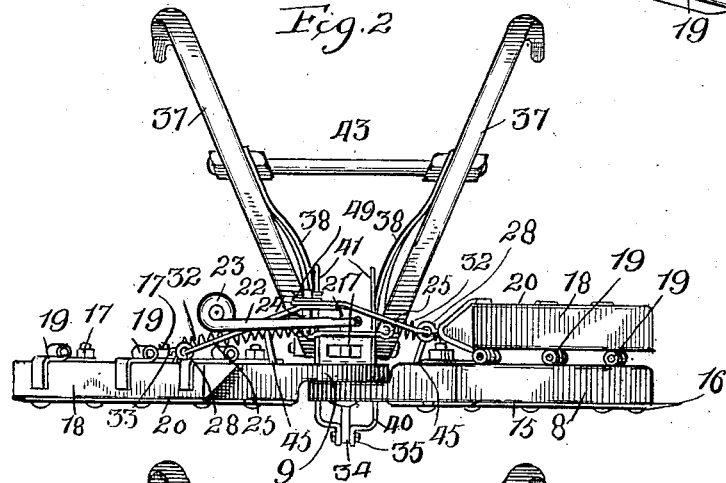
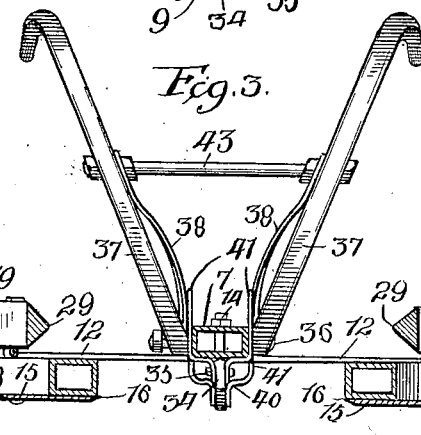

No. 835,499. PATENTED NOV. 13, 1906.
M. P. CARPENTER & W. D. FONVILLE.
COMBINED STALK CUTTER AND HARROW.
APPLICATION FILED JUNE 28, 1906.
2 SHEETS—SHEET 2.
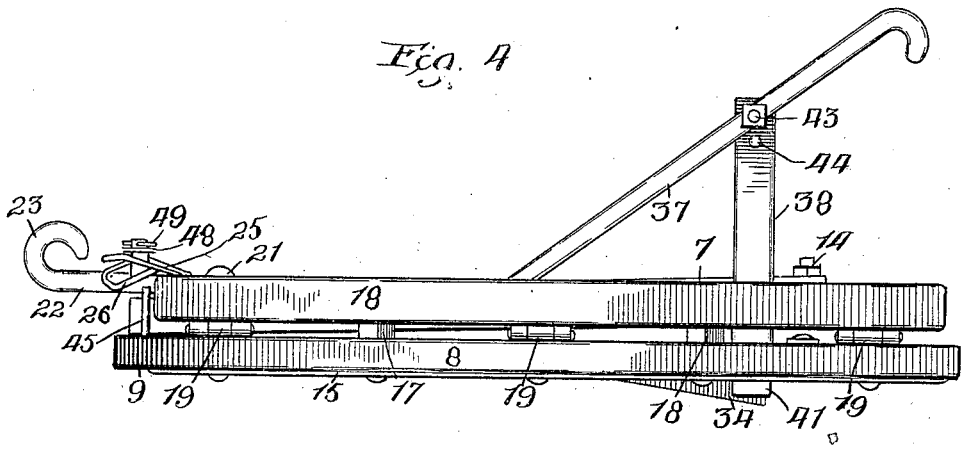
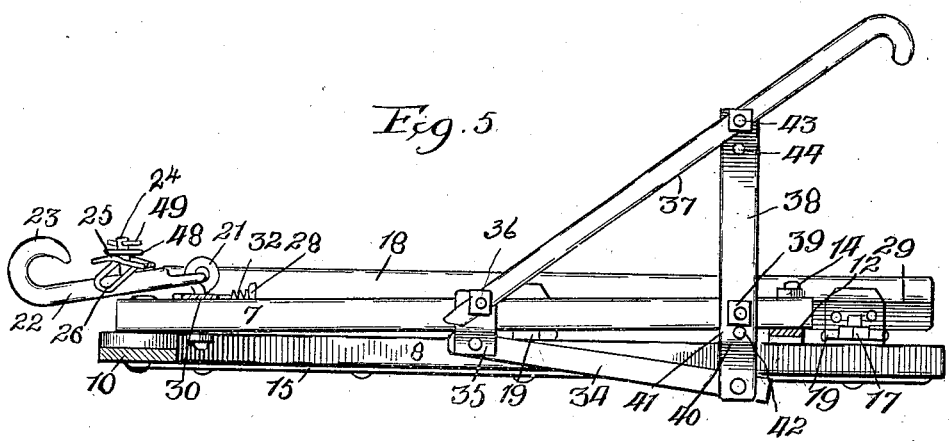
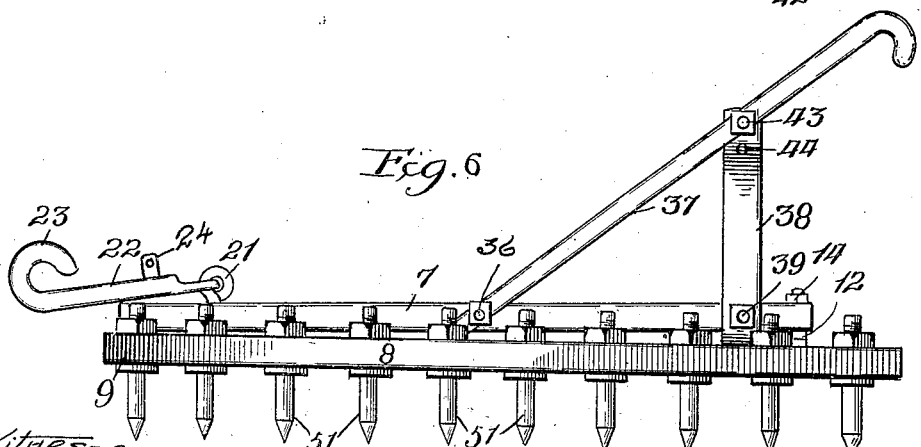

UNITED STATES PATENT OFFICE.

MASON P. CARPENTER AND WILLIAM D. FONVILLE, OF MEXICO, MISSOURI.

COMBINED STALK-CUTTER AND HARROW.

No. 835,499.     Specification of Letters Patent.     Patented Nov. 13, 1906.

Application filed June 28, 1906. Serial No. 323,883.

*To all whom it may concern:*

Be it known that we, MASON P. CARPENTER and WILLIAM D. FONVILLE, citizens of the United States, residing at Mexico, in the county of Audrain and State of Missouri, have invented certain new and useful Improvements in a Combined Stalk-Cutter and Harrow, of which the following is a specification.

This invention has for its object to provide a stalk-cutter adapted to be drawn between rows of corn or other stalks for the purpose of cutting the stalks close to the ground; and the invention more particularly relates to the knife-fenders, which are so constructed and arranged that they will be thrown down over the knife-plate when the horse or horses dragging the cutter make a turn in order to prevent injury to the horse's legs by contact with the sharp knife-edges.

The invention further relates to the means employed for regulating the width and divergence of the cutting-plates to adapt the implement for use under varying conditions and also to the means employed for adjusting the vertical elevation of the guide-runner for adapting the implement for use in ground of different hardness or consistency and having ridges of different heights.

The implement is intended, further, to serve as a harrow by inserting the harrow-teeth in the frame of the cutter, and the means for adjusting the various portions of the mechanism heretofore mentioned serve equally well in adjusting the mechanism for use as a harrow.

The invention consists in the features of construction and combination of parts hereinafter described and claimed.

In the drawings, Figure 1 is a top plan view showing one of the fenders thrown down and the other one in normal position; Fig. 2, the front end elevation of the same; Fig. 3, a cross-sectional view taken on line 3 3 of Fig. 1; Fig. 4, a side elevation; Fig. 5, a longitudinal sectional view, and Fig. 6 a side elevation showing the harrow-teeth in place and the fenders removed.

The implement consists in a frame comprising a central longitudinally-extending beam 7, which is preferably formed of tubular construction, as shown in Fig. 3. To the forward end of the central beam are pivoted a pair of diverging side bars or rails 8, which are likewise of a tubular formation and are rectangular in cross-section, and the side rails or bars are inwardly curved or turned at their forward ends 9, and each is provided at its extreme end with a recessed head 10, which coöperates with the companion head, and the two heads are pivoted together by means of a pivot-bolt 11, which passes through the end of the central beam and serves to hinge the structure at its forward end.

Near the rear ends of the side rails or bars are a pair of inwardly-extending spacing-bars 12, each provided with a plurality of bolt-holes 13, and the inner ends of the two bars are superimposed upon one another in such manner as to bring two of the bolt-holes in alinement, and through the holes is passed a bolt 14, which connects the spacing-bars with the rear end of the central beam and serves to hold the side rails or bars in proper divergence with respect to one another.

Each of the side rails has secured to its under face a knife or cutter 15, having inner and outer cutting edges 16, which adapt the knife to be reversed when desired to bring either of its edges into cutting position, thereby doubling the efficiency of the knife as a cutting implement. The knives are secured to the side rails by means of bolts 17 in position to allow the outer cutting edge to extend outwardly from the side rail a sufficient distance to cut the stalks when brought in contact therewith. The inner edges of the knives are protected by the side rails to which they are secured, so that the inner edges will be kept in sharp condition while the outer edges are being used, which enables the operator to reverse the knife at any time to bring a sharp edge into use in place of an edge previously dulled.

In order to prevent injury to the horse's feet when turning, a pair of fenders 18 are employed, one for each of the knives, and the fenders are in the form of rails or bars wedge-shaped in cross-section and pivoted to the upper outer corners of the side rails by means of hinges 19, which, as shown, are three in number on each side.

When the fender is lowered, as shown in Fig. 2, on the right side of the implement, its outer edge 20 will lie in close contact with the edge of the knife, which prevents the horse's feet from coming in contact with the knife and being injured thereby.

Slightly to the rear of the pivot-pin 11 is an eye 21, upwardly extending from the central beam, and the eye has pivoted thereto a draft-shank 22, terminating in a hook 23 for attachment to the harness of the horses, and the draft-shank is so pivoted that it can be moved from side to side to enable the horses to turn at proper intervals during the operation of the cutter. The draft-shank is provided with an upwardly-extending stud 24, which serves as a mounting for a pair of fender-arms 25, each of which is provided with a slotted head 26, which heads embrace the stud and are actuated thereby. The outer ends of the arms are provided with hooks 27, which engage eyes 28 on the forward hinges of the fenders, which eyes are located at the intermediate ridge or angle 29 of the fenders. The eye 21 passes through a transversely-extending plate 30, having at its outer ends hooks 31, to which are secured coiled springs 32, having their outer ends secured to eyes 33 in close proximity to the eyes 28, and the springs serve to normally hold the fenders away from the knife-edges, as shown on the right in Fig. 2.

Slightly to the rear of the center of the main beam is secured a longitudinally-extending runner 34, which is pivoted between ears 35, which are secured to the main beam by a bolt 36, which likewise serves to secure the forward ends of a pair of diverging handles 37, which slope upwardly toward the rear and are supported by means of a pair of downwardly-converging brace-bars 38, which are secured in position by means of a transversely-extending bolt 39, which passes through the main beam and which likewise passes through a yoke 40, having side arms 41, provided with holes 42, which are adapted to have the bolt pass therethrough to hold the yoke and the rear end of the runner, to which the yoke is secured, in adjusted position. The handles are held extended by means of a rod 43, which extends through the handles and through the upper ends of the brace-bars 38, which latter are provided with a plurality of holes 44 for permitting vertical adjustment of the handles. Near the forward ends of the fenders are a pair of studs 45, which serve to protect the forward ends of the fenders against the admission of trash or broken stalks. The slotted heads 26 are held in position on the stud 24 by means of a washer 48 and cotter-pin 49, which can easily be withdrawn from place to permit the removal of the fender-arms and fenders.

The side rails are provided with a plurality of holes 50, which are adapted for the insertion therethrough of a plurality of harrow-teeth 51, which can be inserted into place when it is desirable to use the implement as a harrow, in which case the fenders and fender-actuating mechanism are removed, together with knives, hinges, and springs.

In use the rear ends of the side rails are adjusted to a suitable degree of divergence, depending upon the distance between the rows of stalks intended to be cut, and the runner is adjusted to suitable vertical elevation, depending upon the hardness of the soil and the amount of lateral pressure exercised upon the knives during the cutting operation and upon the height of the ridges.

As the horses are driven forward the knife-edges will be brought in contact with stalks near the ground, and the gradual divergence of the knife-edges serves to give a shearing action, which cuts down the stalks as the horses advance. The pins at the forward ends of the fenders serve to prevent trash from clogging up behind the fenders, which in normal position and when the horses are directly in front of the cutter interfere in no way with the cutting operation. When the horses make a turn, the draft-shank is thrown around into position shown in Figs. 1 and 2, which throws back the pin or stud 24 to the inner end of the slotted head of the fender-arm on the side of the cutter toward which the horses advance in making the turn. The continued turning of the horses outwardly projects the fender-arm and throws down the fender out of normal position into the position shown at the upper side of Fig. 1, in which position the outer wedge-shaped edge 20 of the fender will lie in close proximity to the knife-edge on the side of the cutter in proximity to the horses, which thoroughly protects the horses from injury during the turning operation. This movement of the fender expands the coiled spring, so that as soon as the horses begin again to advance in a direct line the fender will be returned to normal position by the tension of the spring. The slots in the fender-arm heads are sufficiently long to permit the arm to be thrown out on the one side of the implement without actuating the arm on the opposite side of the implement. When it is desirable to use the implement as a harrow, the side rails can be adjusted in the manner hitherto described and the device changed from a cutter to a harrow without difficulty or inconvenience.

By spreading the divergent rear ends of the side rails more or less the lateral distance between succeeding harrow-teeth can be varied to any desirable extent. The knives in addition to being reversible as to their edges can be turned either side up to bring the beveled edge either at the upper or lower side of the knife, as may be desired. The handles being adjustable can be regulated to suit the convenience and comfort of the operator, and the device as a whole is so adjustable that its various constituent parts can be regulated to any desired extent.

What we regard as new, and which we wish to secure by Letters Patent, is the following:

1. In a device of the class described, the combination of divergent side rails pivoted at their forward ends and two-edged knives secured to the side rails and adapted to have either edge secured in operative position, and fenders for protecting the knife-edges and adapted to be moved by the turning of the horses, substantially as described.

2. In a device of the class described, the combination of divergent side rails secured together at their forward ends and two-edged knives secured to the rails and adapted to have either edge secured in operative position, and fenders normally raised and adapted to be brought down over the knife-edges to protect the horses during the turning operation, substantially as described.

3. In a device of the class described, the combination of divergent side rails pivoted together at their forward ends; knives secured to the side rails, fenders hinged to the side rails, fender-operating arms secured to the fenders and means for throwing forward of either one of the arms by the turning of the horses to throw down the fender on the side adjacent to the horses, substantially as described.

4. In a device of the class described, the combination of divergent side rails, knives secured to the side rails, fenders hinged to the side rails above the knives, fender-operating arms having slotted heads a pivoted mo nted draft-shank, a stud on the draft-shank entered through the slots for throwing down the fender on the side of the device adjacent to the horses during the turning operation, substantially as described.

5. In a device of the class described, the combination of divergent side rails, knives secured to the side rails, fenders hinged to the side rails above the knives, fender-operating arms having slotted heads a pivoted mounted draft-shank, a stud on the draft-shank entered through the slots for throwing down the fender on the side of the device adjacent to the horses during the turning operation, and springs secured to the fenders for returning them to normal position, substantially as described.

6. In a device of the class described, the combination of a main center-beam, side rails pivoted at their forward ends to the main beam and adjustably secured at their rear ends to the main beam, knives removably secured to the side rails, and fenders removably secured to the side rails and adapted to be moved into and out of position to protect the knives, substantially as described.

7. In a device of the class described, the combination of a main center-beam, divergent side rails secured at their forward ends to the main beam, knives secured to the side rails, and fenders adapted to be moved into and out of position to protect the knives, substantially as described.

8. In a device of the class described, the combination of a main center-beam, divergent side rails secured at their forward ends to the main beam, knives secured to the side rails, and fenders pivoted to the sides rails above the knives and adapted to be turned down into position to protect the knives, and adapted to be turned back into position to expose the knives, substantially as described.

9. In a device of the class described, the combination of divergent side rails, means for securing the side rails together, knives secured to the side rails, and fenders pivoted to the side rails adjacent to the knives and adapted to be turned down into position to protect the knives, and turned back into position to expose the knives, substantially as described.

10. In a device of the class described, the combination of divergent side rails secured together at their forward ends, knives secured to the side rails and fenders for protecting the knife-edges, and adapted to be moved into and out of protective position by the turning of the horses, substantially as described.

11. In a device of the class described, in combination with a knife, a fender pivoted in proximity to the knife, and means actuated by the turning of the horses for moving the fender into and out of protective position, substantially as described.

12. In a device of the class described, in combination with a knife, a fender normally raised and adapted to be lowered down over the knife-edge during the turning of the device by the horses, substantially as described.

13. In a device of the class described, in combination with a knife, a fender hinged above the knife, a pivoted draft-shank and a connection between the draft-shank and the fender for turning down the fender over the knife-edge by the movement of the draft-shank, substantially as described.

14. In a device of the class described, the combination of divergent side rails, a knife secured to the under face of each of the rails, fenders hinged to the side rails above the knives, a pivoted draft-shank and a connection between the draft-shank and each of the fenders for throwing down the fender on the side of the device adjacent to the horses during the turning operation, substantially as described.

MASON P. CARPENTER.
WILLIAM D. FONVILLE.

Witnesses:
JOHN T. RICKETTS,
R. D. RODGERS.